United States Patent
Parks et al.

(10) Patent No.: US 10,997,431 B2
(45) Date of Patent: May 4, 2021

(54) CONTROLLING A VEHICLE USING AN ALTERNATE ANCHOR LINE

(71) Applicant: GM GLOBAL TECHNOLOGY OPERATIONS LLC, Detroit, MI (US)

(72) Inventors: Jeffrey S. Parks, Ann Arbor, MI (US); Loren J. Majersik, Salt Lake City, UT (US); Chris C. Swoish, Lapeer, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 331 days.

(21) Appl. No.: 16/000,025

(22) Filed: Jun. 5, 2018

(65) Prior Publication Data

US 2019/0370564 A1  Dec. 5, 2019

(51) Int. Cl.
*G06K 9/00* (2006.01)
*G05D 1/00* (2006.01)
*G05D 1/02* (2020.01)

(52) U.S. Cl.
CPC ....... *G06K 9/00798* (2013.01); *G05D 1/0088* (2013.01); *G05D 1/0246* (2013.01); *G06K 9/00805* (2013.01)

(58) Field of Classification Search
CPC .......... G06K 9/00798; G06K 9/00805; G06K 9/036; G05D 1/0088; G05D 1/0246; B60W 30/00
USPC .......................................... 701/28
See application file for complete search history.

(56) References Cited

U.S. PATENT DOCUMENTS

2017/0057502 A1 * 3/2017 Pandita .................... G06T 7/73

* cited by examiner

*Primary Examiner* — Maceeh Anwari
(74) *Attorney, Agent, or Firm* — Cantor Colburn LLP

(57) ABSTRACT

Examples of techniques for controlling a vehicle using an anchor line are disclosed. In one example implementation, a computer-implemented method includes receiving a lane line quality indicator from a camera associated with a vehicle. The method further includes determining a lane line weight. The method further includes comparing the lane line quality indicator to a quality threshold to determine whether the lane line is of sufficient quality to use as an anchor line. The method further includes comparing the lane line weight to a confidence threshold to determine whether the lane line is of sufficient confidence to use as the anchor line. The method further includes, responsive to determining that at least one of the lane line is not of sufficient quality and the lane line is not of sufficient weight, generating an alternate anchor line. The method further includes controlling the vehicle using the alternate anchor line.

19 Claims, 4 Drawing Sheets

CONTROLLING A VEHICLE USING AN ALTERNATE ANCHOR LINE

The present disclosure relates to controlling a vehicle using an alternate anchor line.

Modern vehicles (e.g., a car, a motorcycle, a boat, or any other type of vehicle) generally include one or more cameras that provide backup assistance, take images of the vehicle driver to determine driver drowsiness or attentiveness, provide images of the road, as the vehicle is traveling, for collision avoidance purposes, provide structure recognition, such as roadway signs, etc. For example, a vehicle can be equipped with multiple cameras, and images from multiple cameras (referred to as "surround view cameras") can be used to create a "surround" or "bird's eye" view of the vehicle. Some of the cameras (referred to as "long-range cameras") can be used to capture long-range images (e.g., for object detection for collision avoidance, structure recognition, etc.).

These vehicles may also be equipped with an in-vehicle display (e.g., a touchscreen) that is used to display camera images and/or other images to a driver of the vehicle. For example, a traditional rear-view mirror and/or side-view mirror may be replaced with a display that displays a camera image from a camera positioned at the rear of the vehicle to display the "rear view" to the driver in place of the traditional rear-view mirror.

SUMMARY

In one exemplary embodiment, a computer-implemented method includes receiving, by a processing device, a lane line quality indicator from a camera associated with a vehicle. The method further includes determining, by the processing device, a lane line weight. The method further includes comparing, by the processing device, the lane line quality indicator to a quality threshold to determine whether the lane line is of sufficient quality to use as an anchor line. The method further includes comparing, by the processing device, the lane line weight to a confidence threshold to determine whether the lane line is of sufficient confidence to use as the anchor line. The method further includes, responsive to determining that at least one of the lane line is not of sufficient quality and the lane line is not of sufficient weight, generating, by the processing device, an alternate anchor line. The method further includes controlling, by the processing device, the vehicle using the alternate anchor line.

In additional examples, the method includes, responsive to determining that the lane line is of sufficient quality and the lane line is of sufficient weight, controlling, by the processing device, the vehicle using the lane line as the anchor line. In additional examples, it is determined that the lane line quality indicator is not of sufficient quality when the lane line quality indicator is less than the quality threshold. In additional examples, it is determined that the lane line weight is not of sufficient confidence when the lane line weight is less than the confidence threshold. In additional examples, controlling the vehicle using the alternate anchor line comprises controlling the vehicle using the alternate anchor line instead of the lane line. In additional examples, the alternate anchor line is generated from coefficients of a lane center calculation. In additional examples, the alternate anchor line is a virtual anchor line. In additional examples, the method includes determining, by the processing device, a quality of at least one lane detection inputs received by an external object calculating module based at least in part on the alternate anchor line, and comparing, by the processing device, the alternate anchor line to a map to validate the alternate anchor line. In additional examples, the lane line is a lane line on a road.

In another exemplary embodiment a system includes a memory having computer readable instructions and a processing device for executing the computer readable instructions for performing a method. The method includes receiving, by a processing device, a lane line quality indicator from a camera associated with a vehicle. The method further includes determining, by the processing device, a lane line weight. The method further includes comparing, by the processing device, the lane line quality indicator to a quality threshold to determine whether the lane line is of sufficient quality to use as an anchor line. The method further includes comparing, by the processing device, the lane line weight to a confidence threshold to determine whether the lane line is of sufficient confidence to use as the anchor line. The method further includes, responsive to determining that at least one of the lane line is not of sufficient quality and the lane line is not of sufficient weight, generating, by the processing device, an alternate anchor line. The method further includes controlling, by the processing device, the vehicle using the alternate anchor line.

In additional examples, the method includes, responsive to determining that the lane line is of sufficient quality and the lane line is of sufficient weight, controlling, by the processing device, the vehicle using the lane line as the anchor line. In additional examples, it is determined that the lane line quality indicator is not of sufficient quality when the lane line quality indicator is less than the quality threshold. In additional examples, it is determined that the lane line weight is not of sufficient confidence when the lane line weight is less than the confidence threshold. In additional examples, controlling the vehicle using the alternate anchor line comprises controlling the vehicle using the alternate anchor line instead of the lane line. In additional examples, the alternate anchor line is generated from coefficients of a lane center calculation. In additional examples, the alternate anchor line is a virtual anchor line. In additional examples, the method includes determining, by the processing device, a quality of at least one lane detection inputs received by an external object calculating module based at least in part on the alternate anchor line, and comparing, by the processing device, the alternate anchor line to a map to validate the alternate anchor line. In additional examples, the lane line is a lane line on a road.

In yet another exemplary embodiment a computer program product includes a computer readable storage medium having program instructions embodied therewith, wherein the computer readable storage medium is not a transitory signal per se, the program instructions executable by a processing device to cause the processing device to perform a method. The method includes receiving, by a processing device, a lane line quality indicator from a camera associated with a vehicle. The method further includes determining, by the processing device, a lane line weight. The method further includes comparing, by the processing device, the lane line quality indicator to a quality threshold to determine whether the lane line is of sufficient quality to use as an anchor line. The method further includes comparing, by the processing device, the lane line weight to a confidence threshold to determine whether the lane line is of sufficient confidence to use as the anchor line. The method further includes, responsive to determining that at least one of the lane line is not of sufficient quality and the lane line is not of sufficient weight, generating, by the processing device, an alternate anchor line. The method further includes controlling, by the processing device, the vehicle using the alternate anchor line.

In additional examples, the method includes, responsive to determining that the lane line is of sufficient quality and the lane line is of sufficient weight, controlling, by the processing device, the vehicle using the lane line as the anchor line.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
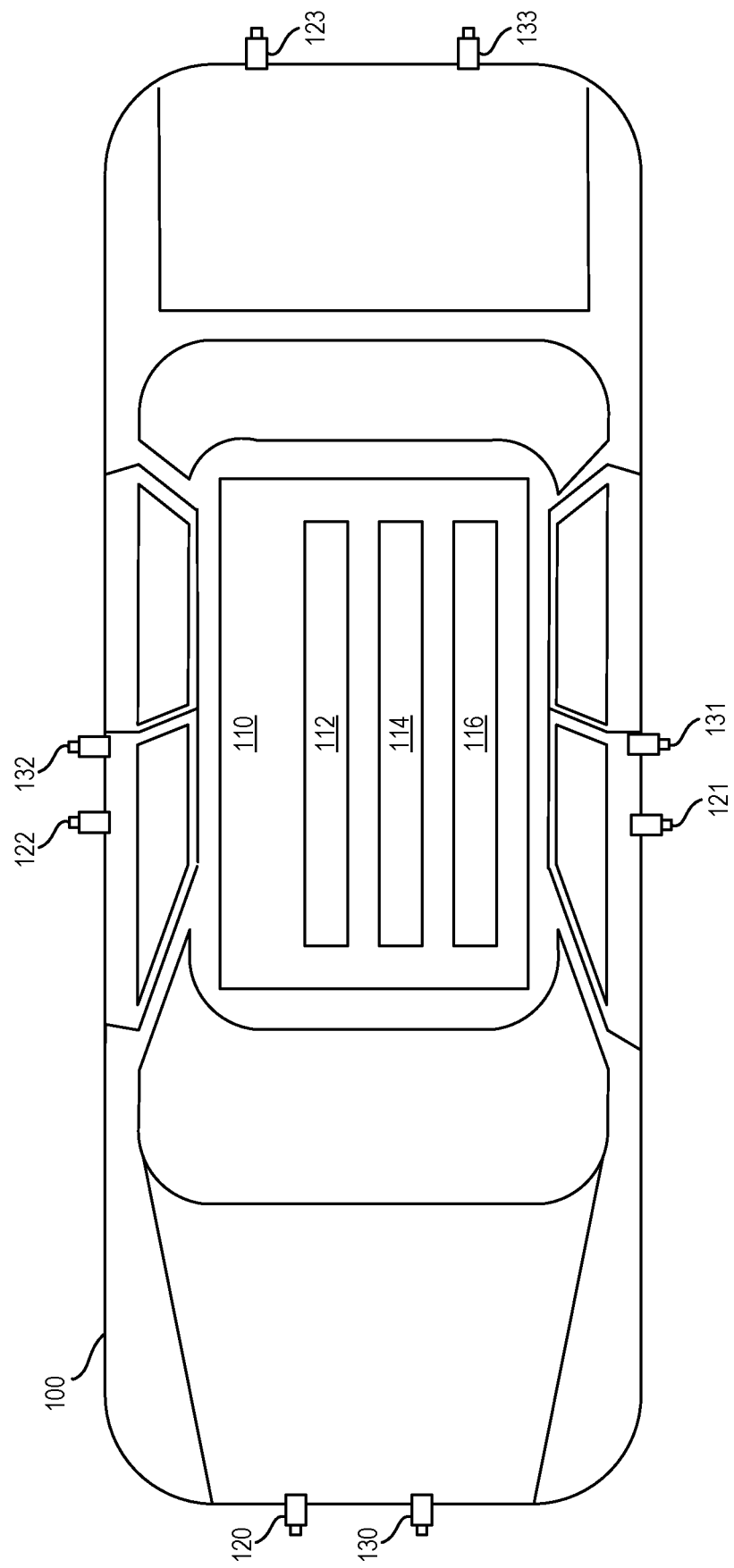
FIG. 1 depicts a vehicle including cameras and a processing system for controlling a vehicle using an alternate anchor line according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide an alternate anchor line useable to control a vehicle when an anchor line (e.g., a lane line) is unusable for controlling the vehicle. Vehicles often implement multiple cameras to capture images external to the vehicle, such as for object detection, collision avoidance, autonomous operation, etc. or to provide information to a driver/operator of the vehicle. A vehicle can be equipped with various types of cameras (e.g., long-range cameras, surround view cameras, etc.) of different numbers of cameras (e.g., one camera per side/end, two cameras per side/end). As one example, cameras can be used to detect line lines on a road. The lane lines can be used, for example, to control a vehicle autonomously, to alert a driver/operator of lane deviations (i.e., when the vehicle is veering out of a lane), to detect exits or other points of interest, and the like.

When a vehicle drives by an exit/entrance to a road (e.g., a freeway exit), an external object calculating module (EOCM) uses an unaffected lane line as an anchor line. In such cases, the lane line acts as a guide that can be used to control the vehicle. The EOCM compares camera inputs from the vehicle to the anchor line to decide whether the other inputs indicate that the vehicle is following the exit/entrance or the current lane occupied by the vehicle. However, in some situations, the anchor line is unusable. Accordingly, the decision about which lane the vehicle is following can be inaccurate. This can result in poor control of the vehicle, unwanted escalation (e.g., an alert to an occupant of an autonomously or semi-autonomously operated vehicle), etc.

The present disclosure describes techniques to generate an alternate anchor line when a lane line, used as an anchor line, is determined to be unsuitable or otherwise unusable to control a vehicle. In particular, the present disclosure receives a lane line quality indicator and determines a lane line weight (confidence). The lane line quality indicator and the lane line weight are both evaluated to determine if the lane line is suitable for use as an anchor line. If either the lane line quality indicator or the lane line weight is insufficient, then an alternate anchor line can be generated, such as from coefficients of a previous lane center calculation or using a virtual anchor line, and the alternate anchor line can be used to control the vehicle.

The present techniques represent an improvement to automotive technologies by improving vehicle control when a lane line is unsuitable or otherwise unusable as an anchor line. In particular, the present techniques describe a new way to evaluate a lane line by determining whether the lane line is of sufficient quality and sufficient weight to use as an anchor line. When the lane line is not of sufficient quality and sufficient weight to use as an anchor line, the present techniques generate a new, alternate anchor line that can be used to control the vehicle, thereby improving vehicle control when a lane line is unusable.

FIG. 1 depicts a vehicle 100 including a processing system 110 for controlling a vehicle using an alternate anchor line according to one or more embodiments. In particular, the vehicle 100 may include the processing system 110, cameras 120, 121, 122, 123, and cameras 130, 131, 132, 133. The vehicle 100 may be a car, truck, van, bus, motorcycle, boat, plane, or another suitable vehicle.

The cameras 120-123 are surround view cameras that capture images external to, and in near proximity to, the vehicle 100. The images captured by the cameras 120-123 together form a surround view (sometimes referred to as a "top-down view" or a "bird's eye view") of the vehicle 100. These images can be used for operating the vehicle (e.g., parking, backing, etc.). The cameras 130-133 are long-range cameras that capture images external to the vehicle and farther away from the vehicle 100 than the cameras 120-123. These images can be used for object detection and avoidance, for example. It should be appreciated that, although eight cameras 120-123 and 130-133 are shown, more or fewer cameras may be implemented in various embodiments.

The captured images can be displayed on a display (not shown) to provide external views of the vehicle 100 to the driver/operator of the vehicle 100. The captured images can be displayed as live images, still images, or some combination thereof. In some examples, the images can be combined to form a composite view, such as the surround view.

The processing system 110 includes an anchor line engine 112, an alternate anchor line engine 114, and a vehicle control engine 116. The processing system 110 evaluates a lane line to determine whether the lane line is suitable for use as an anchor line that can be used for controlling the vehicle 100. Evaluating the lane line includes evaluating the quality and the weight of the lane line. If either the quality or the weight is insufficient, an alternate anchor line may be used. That is, when a lane line is determined to be unsuitable as an anchor line (i.e., unusable for controlling the vehicle 100), an alternate anchor line is generated by the alternate anchor line engine 114, which is used to control the vehicle. The vehicle can be controlled automatically (e.g., by the vehicle control engine 116), manually (e.g., by a driver/operator), or combinations thereof.

The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include a processing device (e.g., the CPU 421 of FIG. 4) for executing those instructions. Thus a system memory (e.g., the RAM 424 of FIG. 4) can store program instructions that when executed by the processing device implement the engines described herein. Other engines can also be utilized to include other features and functionality described in other examples herein.

Figure 2:
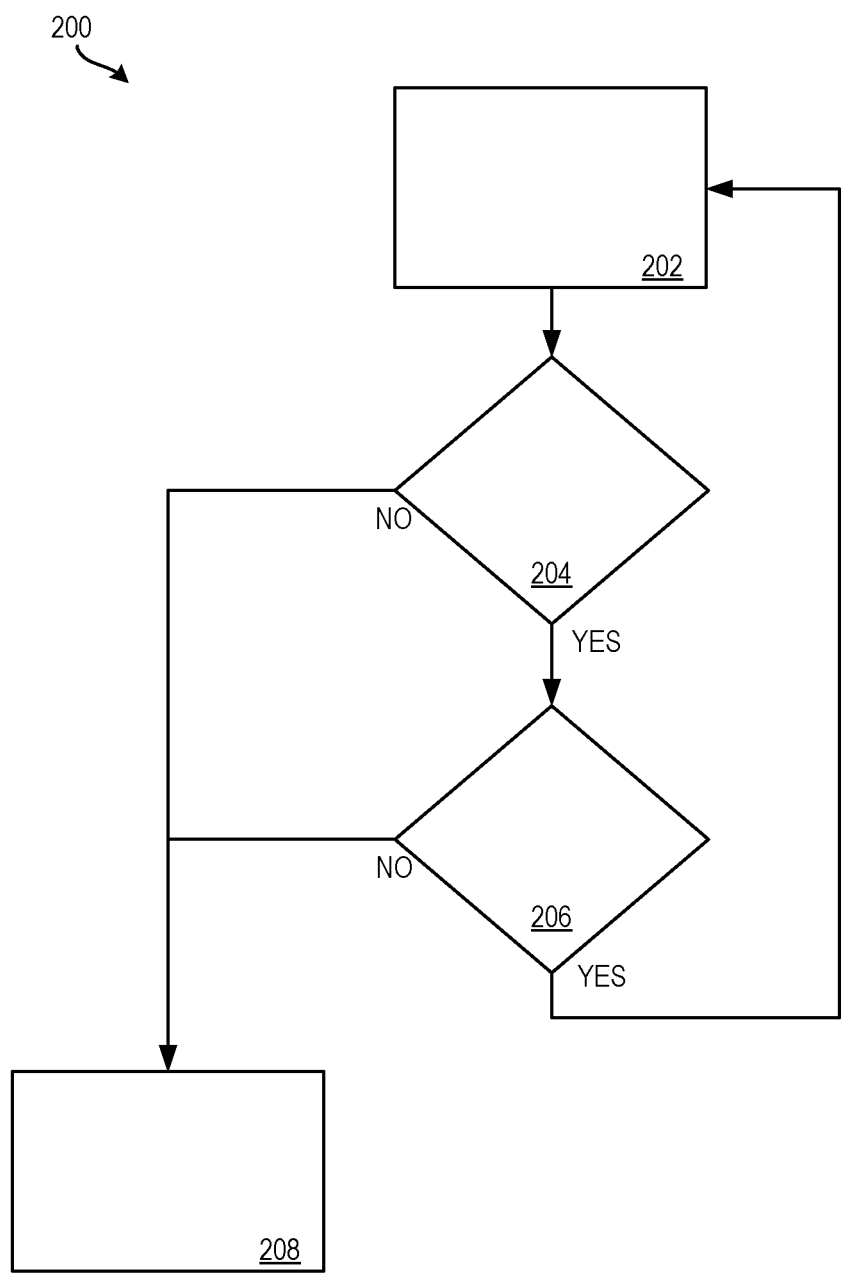
FIG. 2 depicts a flow diagram of a method for controlling a vehicle using an alternate anchor line according to one or more embodiments.

FIG. 2 depicts a flow diagram of a method 200 for controlling a vehicle using an alternate anchor line according to one or more embodiments. The method 200 can be performed by any suitable system or device such as the processing system 110 of FIG. 1, the processing system 400 of FIG. 4, or any other suitable processing system and/or processing device (e.g., a processor).

At block 202, a lane line is used as the anchor line, which acts as a point of reference used for controlling a vehicle (e.g., the vehicle 100) and judging the quality of the other lane line detections. A camera (e.g., one or more of the cameras 120-123, 130-133) capture an image of a lane line or other indicium on a road that is useable to identify a lane of travel of the vehicle on the road.

As the vehicle travels along the road, the lane line is monitored to determine whether the lane line is suitable for use as an anchor line (i.e., a point of reference) to control the vehicle and judge the quality of the other lane line detections. For example, at decision block 204, it is determined whether the quality of the lane line is greater than a first threshold (i.e., a quality threshold). The quality of the lane line is received from a camera (e.g., one or more of the cameras 120-123, 130-133) associated with the vehicle. The quality can be on a scale of 0-3, for example, with 0 being low quality and 3 being high quality. The quality indicates how visible the lane line is to a camera. A threshold (i.e., the first threshold) can be set along this scale (e.g., 2). It should be appreciated that other scales and/or thresholds can be implemented and are within the scope of the present disclosure. If the first threshold is not satisfied (i.e., the quality of the lane line does not meet the quality threshold), then it is determined at decision block 204 that the lane line is unsatisfactory to use as an anchor line, and the method 200 continues to block 208.

However, if it is determined at decision block 204 that the lane line is of sufficient quality to use as an anchor line, the method 200 continues to decision block 206, and it is determined whether a weight of the lane line satisfies a second threshold (i.e., a confidence threshold). The weight represents a line weighting factor or "confidence" in using the lane line as an anchor line. For example, the weight of the lane line can be a measure of how noisy the lane line is (i.e., whether the lane line jumps around), whether a curvature of the lane line matches a map, whether the lane line matches a previous history (i.e., a history recorded by the cameras of the vehicle), how long/wide the lane line is, etc. Lane lines with a higher confidence (higher weight) are considered to be more accurate than lane lines with a lower confidence (lower weight). Accordingly, the second threshold (i.e., the confidence threshold) can be set such that lane lines with a line weight above the threshold are considered to have suitable confidence. In one example, the threshold is set to 0.05 on a scale of 0-1, with 0 representing no confidence and 1 representing confidence. If the second threshold is not satisfied (i.e., the weight of the line does not reflect suitable confidence to meet the confidence threshold), then it is determined at decision block 206 that the lane line is unsatisfactory to use as an anchor line, and the method 200 continues to block 208. If, however, it is determined that the lane line is suitable to use as an anchor line, the method 200 returns to block 202, and the lane line continues to act as the anchor line.

At block 208, when the quality and/or weight of the lane line do not satisfy the respective threshold s as determined at decision blocks 204 and 206 respectively, a new anchor line is generated. The new anchor line can be generated based on coefficients of a lane center calculation (i.e., a calculation of a center of a lane based, for example, on a left and right lane line). That is, a previously calculated lane center is used to project a new (virtual) anchor line for use in controlling the vehicle.

Additional processes also may be included, and it should be understood that the process depicted in FIG. 2 represents an illustration and that other processes may be added or existing processes may be removed, modified, or rearranged without departing from the scope and spirit of the present disclosure.

Figure 3:
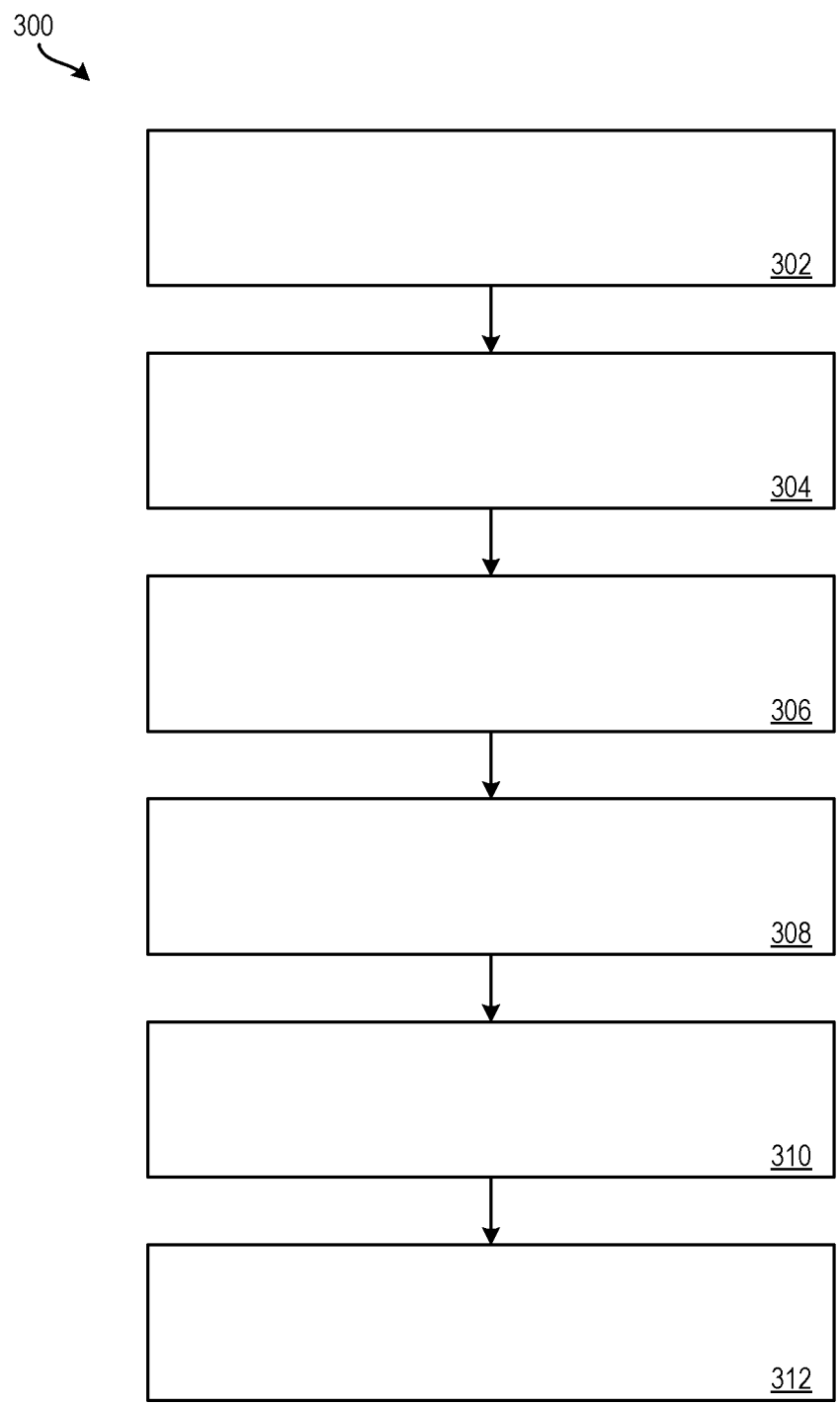
FIG. 3 depicts a flow diagram of a method for controlling a vehicle using an alternate anchor line according to one or more embodiments.

FIG. 3 depicts a flow diagram of a method 300 for controlling a vehicle using an alternate anchor line according to one or more embodiments. The method 300 can be performed by any suitable processing system and/or processing device, such as the processing system 110 of FIG. 1 and/or the processing system 400 of FIG. 4.

At block 302, the anchor line engine 112 receives a lane line quality indicator from a camera (e.g., one of the cameras 120-123, 130-133) associated with a vehicle (e.g., the vehicle 100).

At block 304, the anchor line engine 112 determines a lane line weight, which represents a confidence in using the lane line as an anchor line. The lane line quality indicator is not of sufficient quality when the lane line quality indicator is less than the quality threshold.

At block 306, the anchor line engine 112 compares the lane line quality indicator to a quality threshold to determine whether the lane line is of sufficient quality to use as an anchor line. The lane line weight indicator is not of sufficient confidence when the lane line weight indicator is less than the confidence threshold.

At block 308, the anchor line engine 112 compares the lane line weight to a confidence threshold to determine whether the anchor line is of sufficient weight to use as the anchor line.

At block 310, the alternate anchor line engine 114 generates an alternate anchor line when it is determined by the anchor line engine 112 that the lane line is not of sufficient quality and/or the lane line is not of sufficient confidence. According to one or more embodiments, the alternate anchor line can be compared to a map to validate the alternate lane line. For example, when the alternate anchor line matches (or nearly matches) an expected lane from a map, the alternate lane line is validated. Accordingly, it can be determined whether the alternate anchor line is an adequate replacement for the lane line based at least in part on comparing the alternate anchor line to the map.

At block 312, the vehicle control engine 116, for example, uses the alternate anchor line to control the engine. According to one or more embodiments, controlling the vehicle using the alternate anchor line comprises controlling the vehicle using the alternate anchor line instead of the lane line. Controlling the vehicle can include displaying the anchor line on a display for an operator of the vehicle to follow, automatically causing the vehicle to follow the alternate anchor line, etc.

Additional processes also may be included. For example, the method 300 includes controlling the vehicle using the lane line as the anchor line responsive to determining that the lane line is of sufficient quality and the lane line is of sufficient weight. It should be understood that the process depicted in FIG. 3 represents an illustration, and that other processes may be added or existing processes may be removed, modified, or rearranged without departing from the scope and spirit of the present disclosure. According to one or more embodiments, the method 300 includes determining a quality of at least one lane detection inputs received from an external object calculating module (EOCM) based at least in part on the alternate anchor line. The EOCM can receive lane detection inputs indicative of lane detections (such as from one or more of the cameras 120-123, 130-133), and the quality of these inputs can be determined using the alternate anchor line as a point of reference.

Figure 4:
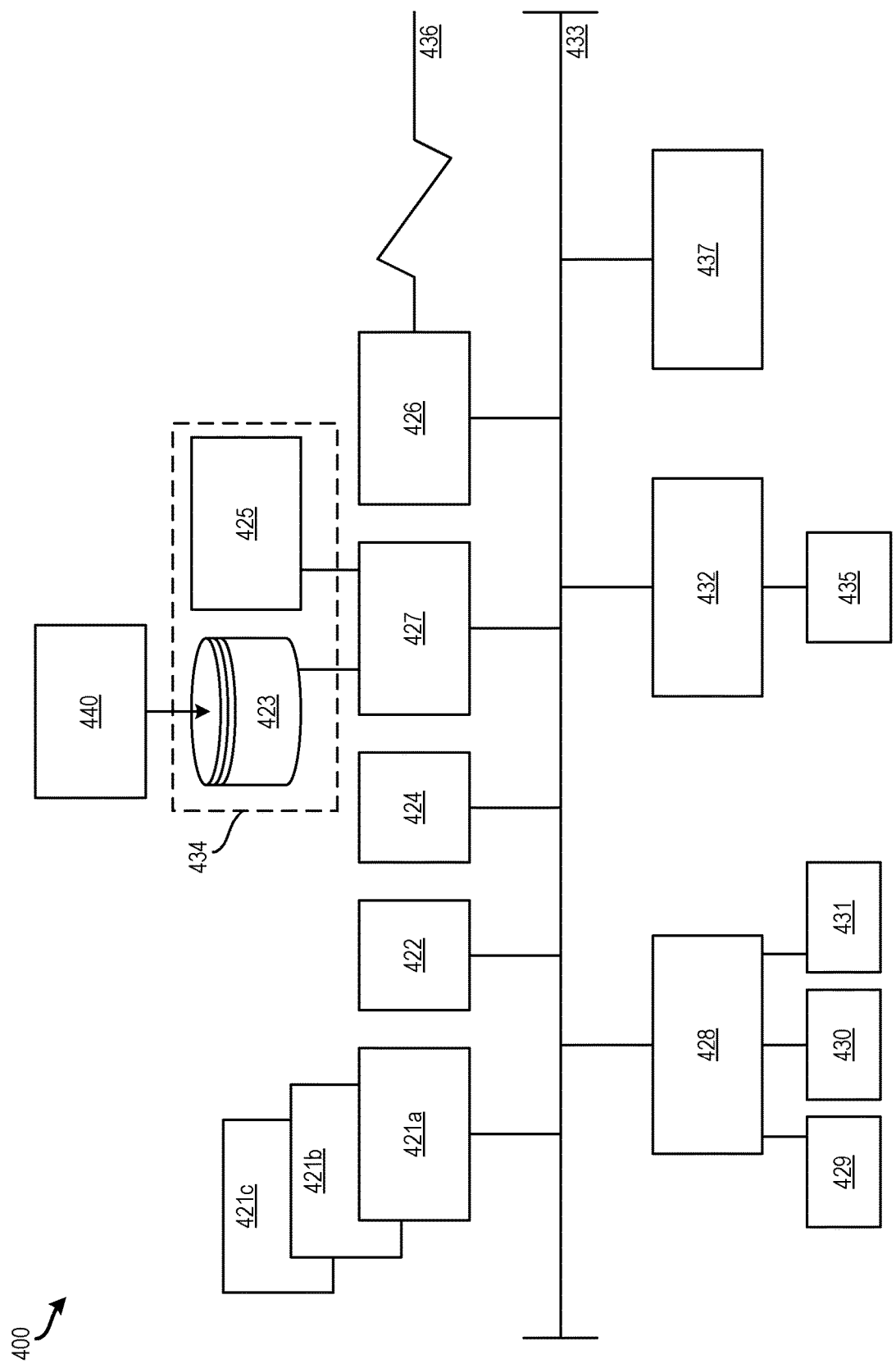
FIG. 4 depicts a block diagram of a processing system for implementing the techniques described herein according to an exemplary embodiment.

It is understood that the present disclosure is capable of being implemented in conjunction with any other type of computing environment now known or later developed. For example, FIG. 4 depicts a block diagram of a processing system 400 for implementing the techniques described herein. In examples, processing system 400 has one or more central processing units (processors) 421a, 421b, 421c, etc. (collectively or generically referred to as processor(s) 421 and/or as processing device(s)). In aspects of the present disclosure, each processor 421 can include a reduced instruction set computer (RISC) microprocessor. Processors 421 are coupled to system memory (e.g., random access memory (RAM) 424) and various other components via a system bus 433. Read only memory (ROM) 422 is coupled to system bus 433 and may include a basic input/output system (BIOS), which controls certain basic functions of processing system 400.

Further depicted are an input/output (I/O) adapter 427 and a network adapter 426 coupled to system bus 433. I/O adapter 427 may be a small computer system interface (SCSI) adapter that communicates with a hard disk 423 and/or a storage drive 425 or any other similar component. I/O adapter 427, hard disk 423, and storage device 425 are collectively referred to herein as mass storage 434. Operating system 440 for execution on processing system 400 may be stored in mass storage 434. Network adapter 426 interconnects system bus 433 with an outside network 436 enabling processing system 400 to communicate with other such systems.

A display (e.g., a display monitor) 435 is connected to system bus 433 by display adaptor 432, which may include a graphics adapter to improve the performance of graphics intensive applications and a video controller. In one aspect of the present disclosure, adapters 426, 427, and/or 432 may be connected to one or more I/O busses that are connected to system bus 433 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 433 via user interface adapter 428 and display adapter 432. A keyboard 429, mouse 430, and speaker 431 may be interconnected to system bus 433 via user interface adapter 428, which may include, for example, a Super I/O chip integrating multiple device adapters into a single integrated circuit.

In some aspects of the present disclosure, processing system 400 includes a graphics processing unit 437. Graphics processing unit 437 is a specialized electronic circuit designed to manipulate and alter memory to accelerate the creation of images in a frame buffer intended for output to a display. In general, graphics processing unit 437 is very efficient at manipulating computer graphics and image processing, and has a highly parallel structure that makes it more effective than general-purpose CPUs for algorithms where processing of large blocks of data is done in parallel.

Thus, as configured herein, processing system 400 includes processing capability in the form of processors 421, storage capability including system memory (e.g., RAM 424), and mass storage 434, input means such as keyboard 429 and mouse 430, and output capability including speaker 431 and display 435. In some aspects of the present disclosure, a portion of system memory (e.g., RAM 424) and mass storage 434 collectively store an operating system to coordinate the functions of the various components shown in processing system 400.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method comprising:
receiving, by a processing device, a lane line quality indicator from a camera associated with a vehicle;
determining, by the processing device, a lane line weight;
comparing, by the processing device, the lane line quality indicator to a quality threshold to determine whether the lane line is of sufficient quality to use as an anchor line, wherein the lane line is of sufficient quality when the lane line quality indicator is greater than or equal to the quality threshold;
comparing, by the processing device, the lane line weight to a confidence threshold to determine whether the lane line is of sufficient weight to use as the anchor line, wherein the lane line is of sufficient weight when the lane line weight is greater than or equal to the confidence threshold;
responsive to determining that at least one of the lane line is not of sufficient quality and the lane line is not of sufficient weight, generating, by the processing device, an alternate anchor line;
controlling, by the processing device, the vehicle using the alternate anchor line; and
determining, by the processing device, a quality of at least one lane detection input received by an external object calculating module based at least in part on the alternate anchor line.

2. The computer-implemented method of claim 1, further comprising:
responsive to determining that the lane line is of sufficient quality and the lane line is of sufficient weight, controlling, by the processing device, the vehicle using the lane line as the anchor line.

3. The computer-implemented method of claim 1, wherein it is determined that the lane line quality indicator is not of sufficient quality when the lane line quality indicator is less than the quality threshold.

4. The computer-implemented method of claim 1, wherein it is determined that the lane line weight is not of sufficient weight when the lane line weight is less than the confidence threshold.

5. The computer-implemented method of claim 1, wherein controlling the vehicle using the alternate anchor line comprises controlling the vehicle using the alternate anchor line instead of the lane line.

6. The computer-implemented method of claim 1, wherein the alternate anchor line is generated from coefficients of a lane center calculation.

7. The computer-implemented method of claim 1, wherein the alternate anchor line is a virtual anchor line.

8. The computer-implemented method of claim 1, further comprising:
comparing, by the processing device, the alternate anchor line to a map to validate the alternate anchor line.

9. The computer-implemented method of claim 1, wherein the lane line is a lane line on a road.

10. A system comprising:
a memory comprising computer readable instructions; and
a processing device for executing the computer readable instructions for performing a method comprising:
receiving, by the processing device, a lane line quality indicator from a camera associated with a vehicle;
determining, by the processing device, a lane line weight;
comparing, by the processing device, the lane line quality indicator to a quality threshold to determine whether the lane line is of sufficient quality to use as an anchor line wherein the lane line is of sufficient quality when the lane line quality indicator is greater than or equal to the quality threshold;
comparing, by the processing device, the lane line weight to a confidence threshold to determine whether the lane line is of sufficient confidence to use as the anchor line wherein the lane line is of sufficient weight when the lane line weight is greater than or equal to the confidence threshold;
responsive to determining that at least one of the lane line is not of sufficient quality and the lane line is not of sufficient weight, generating, by the processing device, an alternate anchor line, wherein the alternate anchor line is generated from coefficients of a previous lane center calculation; and
controlling, by the processing device, the vehicle using the alternate anchor line.

11. The system of claim 10, wherein the method further comprises:
responsive to determining that the lane line is of sufficient quality and the lane line is of sufficient weight, controlling, by the processing device, the vehicle using the lane line as the anchor line.

12. The system of claim 10, wherein it is determined that the lane line quality indicator is not of sufficient quality when the lane line quality indicator is less than the quality threshold.

13. The system of claim 10, wherein it is determined that the lane line weight is not of sufficient confidence when the lane line weight is less than the confidence threshold.

14. The system of claim 10, wherein controlling the vehicle using the alternate anchor line comprises controlling the vehicle using the alternate anchor line instead of the lane line.

15. The system of claim 10, wherein the alternate anchor line is a virtual anchor line.

16. The system of claim 10, wherein the method further comprises:
determining, by the processing device, a quality of at least one lane detection inputs received by an external object calculating module based at least in part on the alternate anchor line; and
comparing, by the processing device, the alternate anchor line to a map to validate the alternate anchor line.

17. The system of claim 10, wherein the lane line is a lane line on a road.

18. A computer program product comprising:
a non-transitory computer readable storage medium having program instructions embodied therewith, the program instructions executable by a processing device to cause the processing device to perform a method comprising:
receiving, by the processing device, a lane line quality indicator from a camera associated with a vehicle;
determining, by the processing device, a lane line weight;
comparing, by the processing device, the lane line quality indicator to a quality threshold to determine whether the lane line is of sufficient quality to use as an anchor line wherein the lane line is of sufficient quality when the lane line quality indicator is greater than or equal to the quality threshold;
comparing, by the processing device, the lane line weight to a confidence threshold to determine whether the lane line is of sufficient confidence to use as the anchor line wherein the lane line is of sufficient weight when the lane line weight is greater than or equal to the confidence threshold;
responsive to determining that at least one of the lane line is not of sufficient quality and the lane line is not of sufficient weight, generating, by the processing device, an alternate anchor line;
controlling, by the processing device, the vehicle using the alternate anchor line; and
causing, by the processing device, the alternate anchor line to be displayed on a display of the vehicle.

19. The computer program product of claim 18, wherein the method further comprises:
responsive to determining that the lane line is of sufficient quality and the lane line is of sufficient weight, controlling, by the processing device, the vehicle using the lane line as the anchor line.

\* \* \* \* \*